United States Patent
Murphy

(10) Patent No.: US 11,974,186 B2
(45) Date of Patent: *Apr. 30, 2024

(54) BEHAVIOR-BASED UAV DETECTION FOR COMMUNICATION NETWORKS

(71) Applicant: T-Mobile USA, Inc., Bellevue, WA (US)

(72) Inventor: Sean Patrick Murphy, Renton, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 267 days.

This patent is subject to a terminal disclaimer.

(21) Appl. No.: 17/525,671

(22) Filed: Nov. 12, 2021

(65) Prior Publication Data

US 2022/0070754 A1  Mar. 3, 2022

Related U.S. Application Data

(62) Division of application No. 15/945,548, filed on Apr. 4, 2018, now Pat. No. 11,212,728.

(51) Int. Cl.
*H04W 48/04* (2009.01)
*G06N 20/00* (2019.01)
(Continued)

(52) U.S. Cl.
CPC .......... *H04W 36/385* (2013.01); *G06N 20/00* (2019.01); *H04W 4/12* (2013.01);
(Continued)

(58) Field of Classification Search
CPC . H04W 36/385; H04W 4/12; H04W 36/0083; H04W 48/04; H04W 64/006;
(Continued)

(56) References Cited

U.S. PATENT DOCUMENTS 9,537,561 B1 * 1/2017 Kotecha ................. H04W 8/00
9,622,133 B1 * 4/2017 Guvenc ............. H04B 7/18504
(Continued)

FOREIGN PATENT DOCUMENTS

KR         101636478 B1    7/2016
KR       20170067195 A     6/2017

OTHER PUBLICATIONS

International Application No. PCT/US2019/022358, International Search Report and Written Opinion dated Jul. 2, 2019, 13 pages.
(Continued)

*Primary Examiner* — Marcus Hammonds

(57) ABSTRACT

The identification of a user device as an unmanned aerial vehicle (UAV) may cause the wireless communication network to implement certain operations. A determination may be made based on one or more behavior characteristics of a user device as to whether the user device is an unmanned aerial vehicle (UAV) instead of an airborne user device carried in a manned aircraft as the user device communicates with a wireless communication network via one or more base stations. In response to determining that the user device is the UAV instead of the airborne user device carried in the manned aircraft, a base station handover threshold for the UAV may be modified to prolong a communication duration of the UAV with a base station when a decrease in signal strength or an increase in signal interference of a signal provided by the base station occurs.

20 Claims, 6 Drawing Sheets

(51) Int. Cl.
*H04W 4/12* (2009.01)
*H04W 36/00* (2009.01)
*H04W 36/38* (2009.01)
*H04W 64/00* (2009.01)

(52) U.S. Cl.
CPC ....... *H04W 36/0083* (2013.01); *H04W 48/04* (2013.01); *H04W 64/006* (2013.01)

(58) Field of Classification Search
CPC . H04W 36/0085; H04W 36/30; H04W 24/02; H04W 36/00837; G06N 20/00; G06N 7/01; G06N 5/046
See application file for complete search history.

(56) References Cited

U.S. PATENT DOCUMENTS

| | | | |
|---|---|---|---|
| 2015/0036663 A1* | 2/2015 | Kilpatrick, II | H04W 36/00837 370/332 |
| 2015/0334625 A1* | 11/2015 | Banks | H04W 36/30 455/440 |
| 2016/0161258 A1 | 6/2016 | Magson et al. | |
| 2016/0225264 A1* | 8/2016 | Taveira | G08G 5/0013 |
| 2017/0025022 A1* | 1/2017 | Henry | H04W 4/029 |
| 2017/0064598 A1* | 3/2017 | Jain | H04W 48/18 |
| 2017/0118688 A1* | 4/2017 | Guvenc | H04B 7/18504 |
| 2017/0295069 A1* | 10/2017 | Sweet, III | C23C 16/24 |
| 2018/0102831 A1* | 4/2018 | Murphy | H04W 64/00 |
| 2018/0247544 A1* | 8/2018 | Mustafic | G08G 5/0034 |
| 2018/0249349 A1* | 8/2018 | Hu | H04W 88/06 |
| 2018/0324662 A1* | 11/2018 | Phuyal | H04W 36/30 |
| 2019/0166516 A1* | 5/2019 | Kim | H04W 36/30 |
| 2019/0212724 A1* | 7/2019 | Phuyal | H04W 84/042 |
| 2019/0289613 A1* | 9/2019 | Fanelli | G08G 5/0013 |
| 2020/0051445 A1* | 2/2020 | Priest | G08G 5/0008 |
| 2020/0137799 A1* | 4/2020 | Chang | H04W 48/20 |
| 2020/0187151 A1* | 6/2020 | Wang | H04W 36/0058 |
| 2020/0236573 A1* | 7/2020 | Zhang | H04W 24/10 |

OTHER PUBLICATIONS

PCT Application PCT/US2019/022358, Written Opinion, dated Jul. 2, 2019. 8 pages.
Phuc Nguyen et al. Matthan: Drone presence Detection by Identifying Phusical Signatures in the Drone's RF Communication . MobiSys '17 Proceedings of the 5th Annual International Conference on Mobile Systems, Applications, and Services. Jun. 2017. ISBN: 978-1-4503-4928-4, pp. 211-224. see pp. 211-224.
U.S. Appl. No. 15/945,548, Office Action, dated Oct. 7, 2019, 9 pages.
U.S. Appl. No. 15/945,548, Restriction Requirement, dated Jun. 27, 2019, 4 pages.
U.S. Appl. No. 15/945,548, Final Office Action dated Apr. 2, 2020, 21 pages.
U.S. Appl. No. 15/945,548, Final Office Action dated Apr. 8, 2021, 33 pages.
U.S. Appl. No. 15/945,548, Notice of Allowance dated Sep. 9, 2021, 27 pages.
U.S. Appl. No. 15/945,548, Office Action dated Aug. 19, 2021, 34 pages.
U.S. Appl. No. 15/945,548, Office Action dated Jun. 25, 2020, 24 pages.

* cited by examiner

BEHAVIOR-BASED UAV DETECTION FOR COMMUNICATION NETWORKS

CROSS REFERENCE TO RELATED PATENT APPLICATION

This patent application is a divisional application of U.S. patent application Ser. No. 15/945,548, filed on Apr. 4, 2018, entitled "Behavior-based UAV Detection for Communication Networks," which is hereby incorporated by reference in its entirety.

BACKGROUND

Unmanned aerial vehicles (UAVs) are aircraft that are controlled from a ground-based control device rather than an onboard human pilot. UAVs are being used in ever increasing number of roles in both the civilian and military sectors. These roles may include law enforcement surveillance, journalism and cinematograph, scientific research and monitoring, search and rescue, cargo transport, package delivery, etc. UAVs are also popular toys for recreational users and hobbyists. While some UAVs can perform limited autonomous flight, UAVs generally rely on control commands provided by ground-based control devices to carry out flight maneuvers and travel per designated flight paths. Accordingly, an UAV operator may use a wireless communication network provided by a wireless carrier to communicatively link a ground-based control device of the UAV operator with UAVs that are performing flight operations. For example, the wireless communication network may be used to continuously transmit flight control commands and guidance data to an UAV, as well as receive UAV telemetry and UAV operation status information from the UAV.

Thus, while UAVs are similar to other user devices in that they use the communication services provided by a wireless communication network, they nevertheless have different communication service needs and operational requirements. For example, because UAVs are remotely controlled aerial drones, they are subject to additional federal, state, or local regulations that do not apply to conventional user device such as smart phones or tablets. Further, UAVs may also have different data usage patterns and quality of service (QoS) requirements than conventional user devices. For example, UAVs are unlikely to have any uplink or downlink voice communication traffic with the wireless communication network, but may have nearly continuous uplink and downlink data traffic with the network while in flight.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

This disclosure is directed to techniques for using behavior characteristics of user devices to identify a particular user device as an unmanned aerial vehicle (UAV). The behavior characteristics of a user device may include information such as a number of base stations that are in the range of the user device at a given moment, a traveling trajectory of the user device, a speed of the user device, a ratio between the uplink data transmitted by the user device to a wireless communication network, and the downlink data transmitted by the network to the user device, and/or other factors. In some embodiments, the wireless communication network may determine that the user device is an UAV based on a comparison of one or more behavior characteristic values to their corresponding thresholds. In other embodiments, the wireless communication network may use a machine learning model that is trained based on the behavior patterns of known UAVs to identify an additional user device as an UAV.

The identification of a user device as an UAV may cause the wireless communication network to implement certain operations. These operations may include modifying a base station handover threshold or a handover delay for the UAV to reduce handover rate of the UAV between base stations. The reduction in handover rate may result in more reliable communication between the UAV and the wireless communication network, as well as the reducing the workload of the wireless communication network. In other instances, the operations may include preventing the UAV from communicating with one or more base stations that are in a vicinity of the UAV in order to reduce handover rate. The reduction in handover rate may increase the reliability of the communication between the UAV and the wireless communication network. In additional instances, the operations may include sending communications regarding UAV-specific service plans of the wireless telecommunication carrier to a communication device of a subscriber that is associated with the UAV. In further instances, the operations may include sending a communication regarding UAV operation regulations to the communication device of the subscriber. Example implementations are provided below with reference to the following FIGS. 1-6.

Example Environment Architecture

Figure 1:
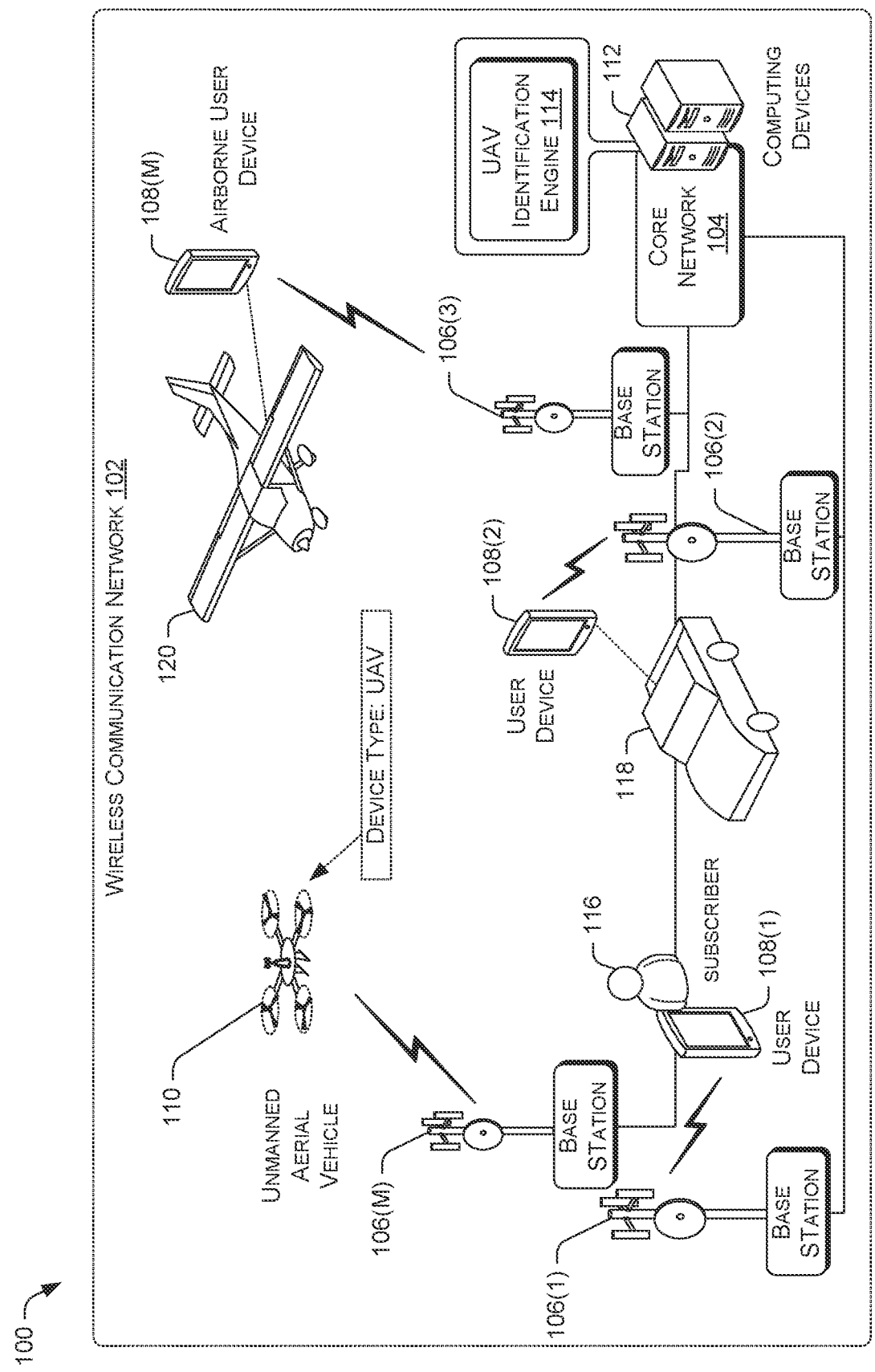
FIG. 1 illustrates an example environment for a wireless communication network to implement behavior-based unmanned aerial vehicle (UAV) detection.

FIG. 1 illustrates an example environment 100 for a wireless communication network to implement behavior-based unmanned aerial vehicle (UAV) detection. The environment 100 may include a wireless communication network 102 that is operated by a wireless telecommunication carrier. The wireless communication network 102 may include a radio access network and a core network 104. The wireless communication network 102 may provide telecommunication and data communication in accordance with one or more technical standards, such as Enhanced Data Rates for GSM Evolution (EDGE), Wideband Code Division Multiple Access (W-CDMA), High Speed Packed Access (HSPA), Long Term Evolution (LTE), CDMA-2000 (Code Division Multiple Access 2000), and/or so forth.

The radio access network may include multiple base stations, such as base stations 106(1)-106(N). The base stations 106(1)-106(N) are responsible for handling voice and data traffic between user devices and the core network 104. In some instances, the user devices may include smartphones, tablet computers, embedded computer systems, or any other device that is capable of using the wireless communication services that are provided by the wireless communication network 102. For example, the user devices may include smartphones 108(1)-108(M), as well as unmanned aerial vehicles (UAVs) that are controlled by UAV operators, such as the UAV 110. The UAVs may perform different roles, such as law enforcement surveillance, journalism and cinematograph, scientific research and monitoring, utility and transportation structure monitoring, search and rescue, cargo transport, etc. In some instances, the UAVs are also operated by hobbyists and recreational users.

Each of the base stations 106(1)-106(N) may provide a corresponding network cell that delivers telecommunication and data communication coverage. The core network 104 may use the network cells to provide communication services to user devices. For example, the core network 104 may connect the UAV 110 to a ground-based control device of an UAV operator. In various embodiments, the core network 104 may include one or more computing devices 112 that implement network components. The network components may include a serving GPRS support node (SGSN) that routes voice calls to and from the public switched telephone network (PSTN), a Gateway GPRS Support Node (GGSN) that handles the routing of data communication between external packet switched networks and the core network 104. The network components may further include a Packet Data Network (PDN) gateway (PGW) that routes data traffic between the GGSN and the Internet. Additionally, an UAV identification engine 114 may be implemented by the computing devices 112 of the core network 104.

The UAV identification engine 114 may assess the behavior characteristics of multiple user devices that are using the telecommunication services provided by the wireless communication network 102. The assessment of the behavior characteristics enables the UAV identification engine 114 to identify user devices that are UAVs, as opposed to other types of conventional user devices, i.e., non-UAV devices. The behavior characteristics of a user device may include information such as the number of base stations that are in the range of the user device at a given moment, a traveling trajectory of the user device, a speed of the user device, a ratio between the uplink data transmitted by the user device to a wireless communication network and the downlink data transmitted by the network to the user device, and/or other characteristics. For example, a user device may be identified by the UAV identification engine 114 as an UAV when the uplink data to downlink data ratio of the user device exceeds a predetermined ratio threshold. In another example, the UAV identification engine 114 may identify a user device as an UAV when the number of base stations that are in communication range of the user device exceeds a threshold.

Accordingly, the UAV identification engine 114 may use one or more behavior characteristics of a user device to determine whether the user device is a terrestrial device. For example, a terrestrial user device may be a smart phone, i.e., user device 108(1), that is carried by a subscriber 116 walking around at street level, or an onboard infotainment device, i.e., user device 108(2), that is installed in a vehicle 118 that is traveling down a street.

In additional embodiments, the UAV identification engine 114 may use the behavior characteristics of user devices to differentiate between UAVs and other airborne user devices that are carried by manned aircraft. For example, the UAV identification engine 114 may perform a comparison of the trajectory of an airborne device to air transportation data to determine whether the airborne user device was previously located at a landing site for manned aircraft, such as an airport or a helipad. Thus, if the trajectory of the airborne device originates from or intersects with the location of the landing site for manned aircraft, the UAV identification engine 114 may determine that the airborne device is an airborne user device 108(3) carried in a manned aircraft 120. For example, the airborne user device 108(3) may be a smartphone that is carried in the pocket of a passenger on an airplane. In another example, the UAV identification engine 114 may determine whether a speed of the airborne device exceeds a speed threshold. Since an UAV may be incapable of traveling faster than a certain speed due to mechanical or regulatory limitations, the UAV identification engine 114 may determine that the airborne device is the UAV 110 if the speed of the airborne device is below or at the speed threshold. Conversely, the airborne device may be determined by the UAV identification engine 114 to be the airborne user device 108(3) if the speed of the airborne device exceeds the speed threshold.

In some instances, the UAV identification engine 114 may apply a machine learning (ML) model to a behavior pattern of a user device to determine whether the user device is a conventional user device. The behavior pattern of a user device may include multiple behavior characteristics of the user device. In such instances, the UAV identification engine 114 may train the ML model based on the behavior patterns of multiple known UAV devices and non-UAV user devices. Accordingly, the machine learning model may be applied by the UAV identification engine 114 to determine whether a user device is an UAV.

Example UAV Identification Engine Components

Figure 2:
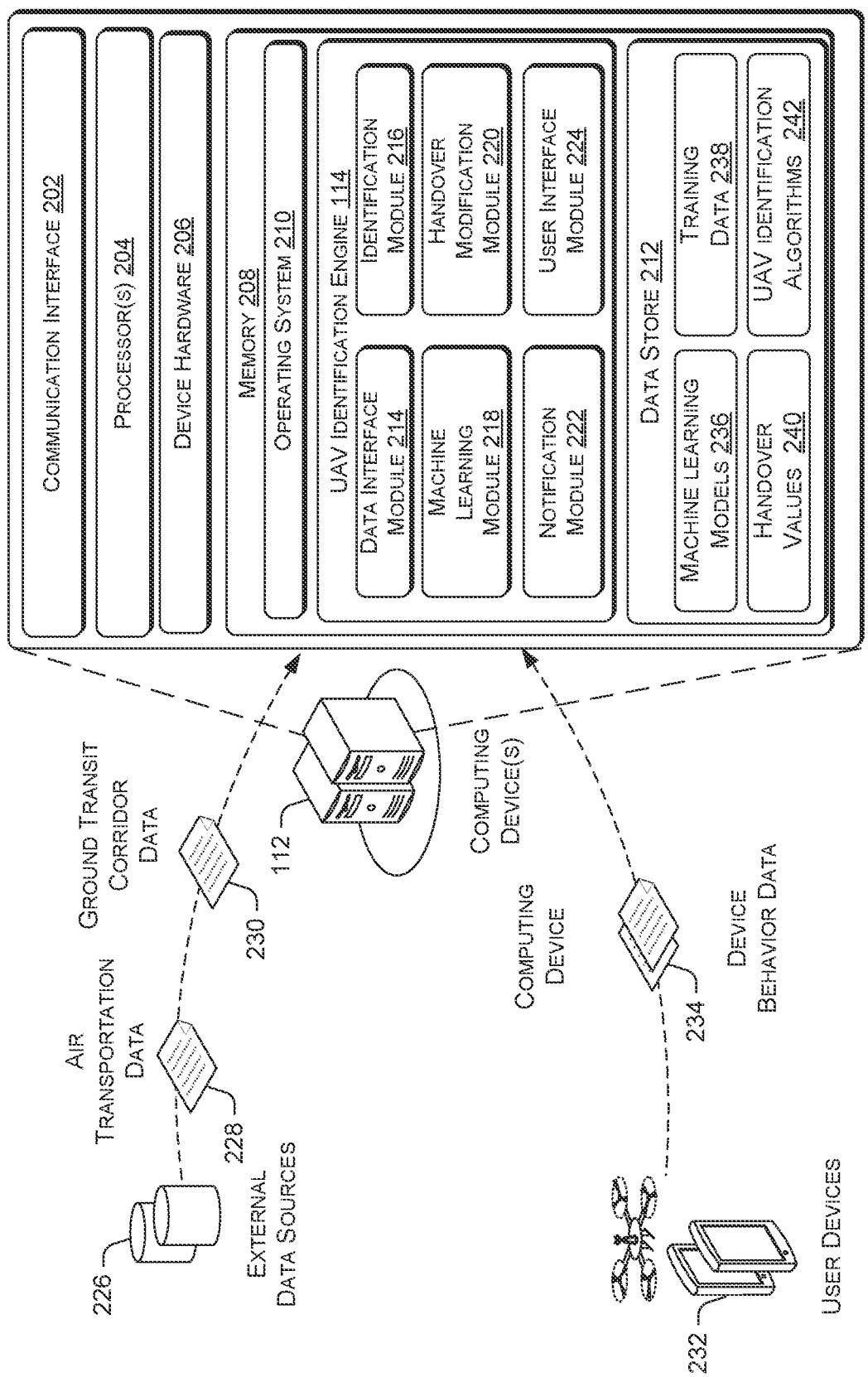
FIG. 2 is a block diagram showing various components of an UAV identification engine that performs behavior-based UAV detection.

FIG. 2 is a block diagram showing various components of an UAV identification engine that performs behavior-based UAV detection. The UAV identification engine 114 may be implemented on one or more computing devices 112. The computing devices 112 may be a part of the radio access network or the core network 104. Alternatively, the computing devices 112 may be operated by a third-party service provider that is distinct from the wireless communication network 102. The computing devices 112 may include general purpose computers, servers, or other electronic devices that are capable of receiving inputs, processing the inputs, and generating output data. In other embodiments, the computing devices 112 may be virtual computing devices in the form of virtual machines or software containers that are hosted in a cloud.

The computing devices 112 may include a communication interface 202, one or more processors 204, device hardware 206, and memory 208. The communication interface 202 may include wireless and/or wired communication components that enable the computing devices to transmit data to and receive data from other networked devices via the wireless communication network 102 and/or an additional network. For example, the additional network may be local area network (LAN), a larger network such as a wide area network (WAN), or a collection of networks, such as the Internet. The device hardware 206 may include additional hardware that performs user interface, data display, data communication, data storage, and/or other server functions.

The memory 208 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital storage disks or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The processors 204 and the memory 208 of the computing devices 110 may implement an operating system 210 and the UAV identification engine 114. The operating system 210 may include components that enable the computing devices 110 to receive and transmit data via various interfaces (e.g., user controls, communication interface, and/or memory input/output devices), as well as process data using the processors 204 to generate output. The operating system 210 may include a presentation component that presents the output (e.g., display the data on an electronic display, store the data in memory, transmit the data to another electronic device, etc.). Additionally, the operating system 210 may include other components that perform various additional functions generally associated with an operating system. The memory 208 may further contain a data store 212 for storing data used by the UAV identification engine 114.

The UAV identification engine 114 may include a data interface module 214, an identification module 216, a machine learning module 218, a handover modification module 220, and a notification module 222. These modules may include routines, program instructions, objects, and/or data structures that perform particular tasks or implement particular abstract data types. The data interface module 214 may use a scheduler to check for and retrieve data from multiple data sources, such as the external data source 226. The scheduler may perform the checking and retrieval based on configurable policies. For example, a configurable policy may specify the source data location, frequency of data retrieval, data retention period, and data disposal date/time. In various embodiments, the data interface module 214 may employ data adapters to obtain data files from the data sources. The data adapters may use file transfer protocol (FTP), Hypertext Transfer Protocol (HTTP) posts, direct network infrastructure element connection, and/or other data transfer protocols to retrieve the data files from the data sources. The data may be in the form of JavaScript Object Notation (JSON) records, Structured Query Language (SQL) records, and/or so forth.

In some embodiments, the data interface module 214 may perform data integrity tests to verify the integrity of the received data files. In some instances, the data files that are received by the data interface module 214 may contain encrypted data. Accordingly, the data interface module 214 may use an asymmetric or symmetric encryption algorithm to decrypt the data. The data interface module 214 may further merge data from multiple data files, such that the merged data may be fed into other modules for analysis.

In various embodiments, the data interface module 214 may retrieve air transportation data 228 and ground transit corridor data 230 from the external data source 226. The air transportation data 228 may include information regarding aircraft landing facilities and runways, air traffic corridors, air traffic regulations and restrictions, and/or other information that pertains to manned aviation in multiple geographical areas. The ground transit corridor data 230 may include information on transit ways (e.g., residential streets, arterials, highways, freeways, railways, nautical ship lane, etc.), corresponding speed limits for the transit ways, traffic condition and congestion data, transit way closure information, and/or other information related to ground or water transportation infrastructures.

The identification module 216 may receive the behavior characteristics of user devices 232, either independently or in conjunction with the data from the external data sources 226. In turn, the identification module 216 may use the behavior characteristics and/or external source data to identify the user devices 232 as either UAVs or non-UAVs. The non-UAVs are also referred to as conventional user devices. The behavior characteristics may be contained in the device behavior data 234 that are transmitted by the user devices to the core network 104. The behavior characteristics may include information such as the number of base stations that are in the range of the user device at a given moment, a traveling trajectory of the user device, a speed of the user device, a ratio between the uplink data transmitted by the user device to a wireless communication network and the downlink data transmitted by the network to the user device, and/or other characteristics. In some instances, such behavior characteristics may include measurements and readings that are reported directly by the user devices to the core network 104 of the wireless communication network 102. In other instances, the behavior characteristics may include values that are calculated or extrapolated by the identification module 216 based on the reported measurements and readings for the purpose of UAV identification. The user devices may periodically report the measurements and readings in downlink communication with the core network 104 in accordance with communication protocols and standards. Additionally, the user devices may report the measurements and readings in response to a query from the identification module 216.

For example, a user device may be identified by the identification module 216 as an UAV when the uplink data to downlink data ratio exceeds a predetermined ratio threshold. The downlink data is the data that the user device receives via the wireless communication network 102, while the uplink data is the data that the user device transmits to a destination device via the wireless communication network 102. Accordingly, since an UAV may be constantly sending UAV identification and location data to a ground control center and/or sending requests steering and flight control commands, the amount of uplink data that is transmitted by the UAV may be higher than a baseline level averaged across all other common user devices. In contrast, common user devices such as smartphones or tablet computers are generally used to consume content, i.e., receive uplink data. For example, the uplink to downlink data ratio for a common user device may be 2:5, while the uplink to downlink ratio for an UAV may be 10:5.

In another example, the identification module 216 may identify a user device as an UAV when the number of base stations that are in range of the user device exceeds a threshold. A user device is in range of a base station when that user device is able to establish a communication link with the base station and the communication link is sufficiently robust for the transmission of downlink and uplink data between the base station and the user device. Airborne user devices such as UAVs are able to be in range of more base stations than terrestrial user devices because their higher elevations reduce communication blockage due to ground clutter. Thus, while a terrestrial user device may be in range of three or four base stations at any given time, an UAV that is airborne may be in the range of 10 or more base stations at the same time.

In an additional example, the identification module 216 may also use behavior characteristics such as signal interference measurements reported by a user device or a handover rate of a user device or to directly determine or verify whether the user device is an UAV. Signal interference measurements may include an energy to interface ratio (EC/IO), a reference signal received quality (RSRQ), a signal to interference-plus-noise ratio (SINR), or other measurements. At higher altitudes, the mutual signal interference between signals emanating from multiple base stations may increase due to the lack of ground obstacles and/or clear lines of sight between the base stations. Thus, a signal interference measurement that is reported by a user device for a base station may exceed a predetermined measurement. In such a scenario, the identification module 216 may use such a development either independently or in conjunction with one or more other behavior characteristics of the user device to determine that the user device is an UAV.

A handover is a transfer of a user device between multiple base stations, in which a handover may be triggered by radio signal strength or radio signal quality as detected by the user device. In various embodiments, the radio signal quality may be quantified using signal interference measurements. The radio signal strength may be quantified using a received signal strength indicator (RSSI), a reference signal received power (RSRP), a received channel power indicator (RCPI), or other measurements. For example, as the radio signal strength emanating from a first base station to the user device meets or falls below a handover threshold in the form of a signal strength threshold, the core network 104 may trigger the user device to switch its communication connection from the first base station to a second base station that has a radio signal strength above the handover threshold. In another example, as the radio interference measurement of the signal emanating from the first base station to the user device meets or exceeds a handover threshold in the form of a radio interference threshold, the core network 104 may trigger the user device to switch its communication connection from the first base station to a second base station that is emanating a signal with a signal interference measurement that is at or below the handover threshold. Further, a handover rate refers to a number of handovers that occur for a user device over a predetermined time interval. The handover rate of user device may increase with increased altitude due to an increased number of in range base stations and/or increased signal interference between base stations. Thus, the identification module 216 may use a handover rate of a user device exceeding a predetermined rate threshold independently or in conjunction with one or more other behavior characteristics of the user device to determine that the user device is an UAV.

The identification module 216 may use the ground transit corridor data 230 and a trajectory of the user device to determine or verify that the user device is an UAV. For example, the identification module 216 may determine that a trajectory of the user device indicates that the user device is traveling along a transit way for a predetermined amount of time and within a predetermined speed range of the corresponding speed limit of the transit way, e.g., ±10 miles per hour of the speed limit. For a such a determination, the identification module 216 may determine that the user device is a non-UAV. However, the identification module 216 may determine that the trajectory indicates that the user device is not traveling along any known transit way, or traveled along a transit way for less than a predetermined amount of time. For example, the user device may veer off the transit way in less than the predetermined amount of time and then travel for an additional predetermined amount of time along a new trajectory. Further, the ground transit corridor data 230 may indicate that no corresponding transit way exists along the new trajectory. In such scenarios, the identification module 216 may determine that the user device is an UAV. In another scenario, the trajectory and speed of the user device may indicate that the user device is traveling along a transit way at a speed that exceeds the speed limit of the transit way and/or a current vehicle traffic speed for the transit way by a predetermined margin value. In such a scenario, the identification module 216 may determine that the user device is an UAV.

The identification module 216 may further monitor the data traffic of user devices to determine whether a user device is an UAV. In some scenarios, an UAV may be mandated by governmental regulation to report its location information to a ground control center. The location information may include a unique identifier of the UAV, geolocation coordinates of the UAV, an altitude of the UAV, telemetry information of the UAV, and/or other information. The UAV may also be subject to preemptive flight control commands from the ground control center. The UAV may be configured to accept the preemptive flight control commands as override commands over the flight control commands inputted by a normal operator of the UAV. The preemptive flight control commands may be transmitted by the ground control center to prevent an imminent collision between the UAV and another flying vehicle, or between the UAV and a ground object. The flight control commands from the ground control center may also maintain the UAV at a predetermined separation from other flying vehicles.

Thus, the communication between the UAV and a ground control center may take the form of uplink data that is transmitted by the UAV to the ground control center, and downlink data that originates from the ground control center and is received by the UAV. Accordingly, the identification module 216 may determine that a user device is an UAV when uplink data is transmitted by the user device to a known network address of a ground control center. The network address may be an Internet Protocol (IP) address or a Uniform Resource Locator (URL). Similarly, the identification module 216 may determine that the user device is an UAV when downlink data routed to the user device originated from a known network address of a ground control center. In various embodiments, the identification module 216 may maintain a list of IP addresses or URLs of known UAV ground control centers, in which the URLs may be resolved by the identification module 216 into IP addresses. Accordingly, the identification module 216 may compare the source IP address and/or the destination IP address of individual data packets routed to and from user devices to the known IP addresses of ground control centers. Thus, a match between a source IP address or a destination IP address and a ground control center IP address indicates to the identification module 216 that a corresponding user device is an UAV.

In additional embodiments, the identification module 216 may use the behavior characteristics of a user device to differentiate between UAVs and other airborne user devices that are carried by manned aircraft. For example, the identification module 216 may perform a comparison of the trajectory of an airborne device to the air transportation data to determine whether the airborne use device was previously located at a landing site for manned aircraft, such as an airport or a helipad. Thus, if the trajectory of the airborne device originates from or intersects with the landing site for manned aircraft, the identification module 216 may determine that the airborne device is the airborne user device 108(3) carried in a manned aircraft 120. For example, the airborne user device 108(3) may be a smartphone that is carried in the pocket of a passenger on an airplane. In another example, the identification module 216 may determine whether a speed of the airborne device exceeds a speed threshold. Since an UAV may be incapable of traveling faster than a certain speed due to mechanical or regulatory limitations, the identification module 216 may determine that the airborne device is the UAV 110 if the speed of the airborne device is traveling below or at the speed threshold. Conversely, the airborne device may be determined by the identification module 216 to be the airborne user device 108(3) if the speed of the airborne device exceeds the speed threshold.

Figure 4:
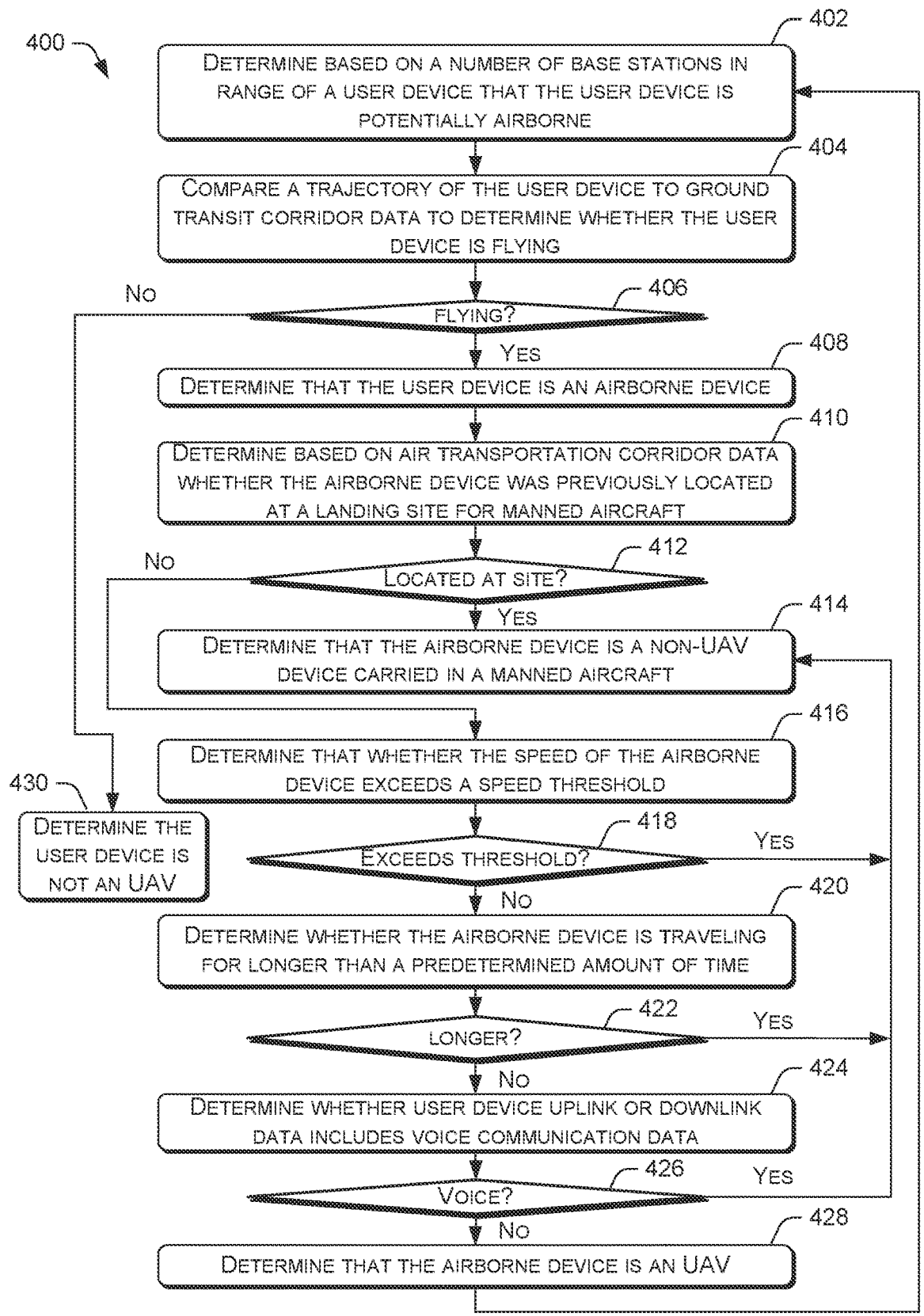
FIG. 4 is a flow diagram of an example process for identifying an airborne device as an UAV or a user device carried in a manned aircraft based on multiple user device behavior characteristics.

As further described with respect to FIG. 4, the identification module 216 may use other behavior characteristics of a user device to distinguish or verify that the user device is an UAV. Such behavior characteristics may include whether the airborne device is traveling off of any ground transit corridor for longer than a predetermined amount of aloft time, whether the uplink or downlink data of the user device includes voice data, and/or so forth. For instance, manned aircraft generally have longer aloft time than UAVs due to their power output and/or energy storage capacity. Thus, when an airborne device is aloft for more than a predetermined amount of aloft time, the identification module 216 may determine that the airborne device is a user device carried in a manned aircraft, rather than being an UAV. In at least one embodiment, the airborne device is deemed to be aloft when it does not remain stationary at a particular geolocation for more than a predetermined amount of time. In another instance, the identification module 216 may determine that the airborne device is a user device carried in a manned aircraft in response to the detection of voice communication data in the uplink or downlink data of the airborne device.

The behavior characteristics of a user device may further include an operating system that manages the software and hardware resources and/or operations of the user device. Accordingly, the identification module 216 may query an operating system of the user device for an operating system identifier. Alternatively, the identification module 216 may receive a notification from the user device that includes an operating system identifier. The notification may be sent by the user device periodically or intermittently as a part of communication data traffic between the user device and the core network 104. In some embodiments, the identification module 216 may maintain a list of operating system identifiers of operating systems that are known to be used by non-UAV user devices for comparison with an operating system identifier of the user device. Thus, the identification module 216 may determine that a user device is an UAV when the operating system identifier of the user device fails to match any operating system identifiers on the list. In other embodiments, the identification module 216 may maintain a list of operating system identifiers of operating systems that are known to be used by UAVs for comparison with an operating system identifier of the user device. Thus, the identification module 216 may determine that a user device is an UAV when the operating system identifier matches an operating system identifier on the list. While the identification module 216 may make an UAV determination by ascertaining whether each of one or more behavior characteristics of a user device meet its corresponding threshold using a specific algorithm, the identification module 216 may also use machine learning to perform the UAV determination.

The machine learning module 218 may generate a machine learning model for identifying a user device as an UAV. The machine learning module 218 may use machine learning algorithms to generate a machine learning model. Various classification schemes (explicitly and/or implicitly trained) and/or systems may be employed by the machine learning module 218 for the generation of the machine learning model. A classifier is a function that maps an input attribute vector, $x=(x_1, x_2, x_3, x_4, \ldots x_n)$, to a confidence that the input belongs to a class, that is, $f(x)=confidence(class)$. Such classification may employ a probabilistic and/or statistical-based analysis (e.g., factoring into the analysis utilities and costs) to generate the machine learning model. A support vector machine (SVM) is an example of a classifier that may be employed by the machine learning module 218. The SVM operates by finding a hypersurface in the space of possible inputs, which hypersurface attempts to split the triggering criteria from the non-triggering events. Other directed and undirected model classification approaches include, e.g., naïve Bayes, Bayesian networks, decision trees, neural networks, fuzzy logic models, and probabilistic classification models providing different patterns of independence may also be employed. Those of skill in the art will understand that any appropriate directed or undirected model classification approach may be used.

The machine learning module 218 may train the machine learning model using training data. The training data that is used by the machine learning module 218 to generate the machine learning model may include the air transportation data 228 and the ground transit corridor data 230. The training data may further include the historical behavior patterns of known UAVs that receive telecommunication services from the wireless communication network 102 and/or other wireless communication networks, as well as historical behavior patterns known non-UAVs, i.e., conventional user devices, that receive telecommunication services from the wireless communication network 102 and/or other wireless communication networks. The behavior pattern of a user device may include multiple behavior characteristics of the user device. Subsequently, the machine learning module 218 may apply the machine learning model to a behavior pattern of a user device to determine whether the user device is an UAV. In various embodiments, the machine learning model may be used to calculate a probability value for whether a user device is an UAV. In other words, given a behavior pattern (a, b, c) of a user device, a machine learning model function $P_M(a, b, c)$ may provide a probability value $P_S$. The machine learning module 218 may determine that a user device is an UAV when the probability value exceeds a probability threshold.

The handover modification module 220 may modify a base station handover threshold for a user device that is identified as an UAV by the identification module 216. The base station handover threshold is used by a handover control mechanism of the core network 104 to perform handover of the UAV between different base stations. In various embodiments, the handover modification module 220 may adjust the base station handover threshold to reduce handover rate of the UAV between base stations. For example, the handover modification module 220 may decrease a value of a signal strength threshold or increase a value of a signal interference threshold. The decrease in the value of the signal strength threshold means that the UAV will maintain communication with a base station despite a lower signal strength measurement that otherwise would have trigged a handover. Likewise, the increase in the value of the signal interference threshold means that the UAV will maintain communication with a base station despite a higher signal interference measurement that otherwise would have triggered a handover. Such threshold modifications may prolong a communication duration of the UAV with a base station despite a decrease in signal strength or an increase in signal interference of the radio signal provided by the base station.

Alternatively or concurrently, the handover modification module 220 may configure the handover control mechanism to delay the initiation of a handover of the UAV between base stations once a handover threshold has been reached. This may provide a possibility for a signal strength or a signal quality of a base station signal to recover during the time delay to make the base station handover unnecessary. Thus, the handover initiation delay may have a similar effect of reducing handover rate of the UAV between stations.

In other instances, the handover modification module 220 may configure the handover control mechanism of the core network 104 to make specific base stations unavailable for communication with the UAV. For example, the modification by the handover modification module 220 may make a certain number of a base stations that are adjacent to a preselected spaced out pattern of base stations unavailable for communication with the UAV. Accordingly, the handover control mechanism may ignore specific base stations as being available to takeover communication with the UAV even when a normal handover protocol of the handover control mechanism would have initiated a handover of the UAV to those base stations. Such selective suppression of base stations may also reduce a handover rate for the UAV by preventing excessive handover of the UAV between multiple base stations.

The notification module 222 may send out electronic communications regarding a user device that is identified as an UAV. In various embodiments, the notification module 222 may be a part of a billing function, e.g., an Online Charging System (OCS), a policy engine, e.g., a Policy and Charging Rules Function (PCRF), or another component of the core network 104. The electronic communications may be in the form of emails, text messages, instant messages, pre-recorded voice messages, pre-recorded multimedia messages, web links to text and media data, and/or so forth. The notification module 222 may send the electronic communications regarding an UAV to a communication device of a subscriber that is associated with the UAV. For example, the subscriber may be an account holder that is paying for the telecommunication services provided by the wireless communication network 102 and used by the UAV. In another example, the subscriber may have an account that is linked to a subscriber identity module (SIM) installed in the UAV. In various embodiments, the communications may include information regarding UAV-specific service plans or offers of the wireless communication network 102, government mandated UAV operation regulations, and/or so forth.

The user interface module 224 may enable a user to interact with the UAV identification engine 114 via a user interface controls. The user interface controls may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices or other electronic/software selection methods. Accordingly, the user may input network locations of the external data sources 226, select corpus of training data for the machine learning module 218, modify handover threshold and delay values, upload or generate UAV identification algorithms, modify a list of UAV or non-UAV device operating system identifiers, and/or so forth.

The data store 212 may store data that are processed or generated by the UAV identification engine 114. The data store 212 may include one or more databases, such as relational databases, object databases, object-relational databases, and/or key-value databases that store data. For example, data stored in the data store 212 may include machine learning models 236, training data 238, handover values 240, UAV identification algorithms 242, and/or other data.

Example Processes

FIGS. 3-6 present illustrative processes 300-600 for implementing behavior-based unmanned aerial vehicle (UAV) detection. Each of the processes 300-600 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 300-600 are described with reference to the environment 100 of FIG. 1.

Figure 3:
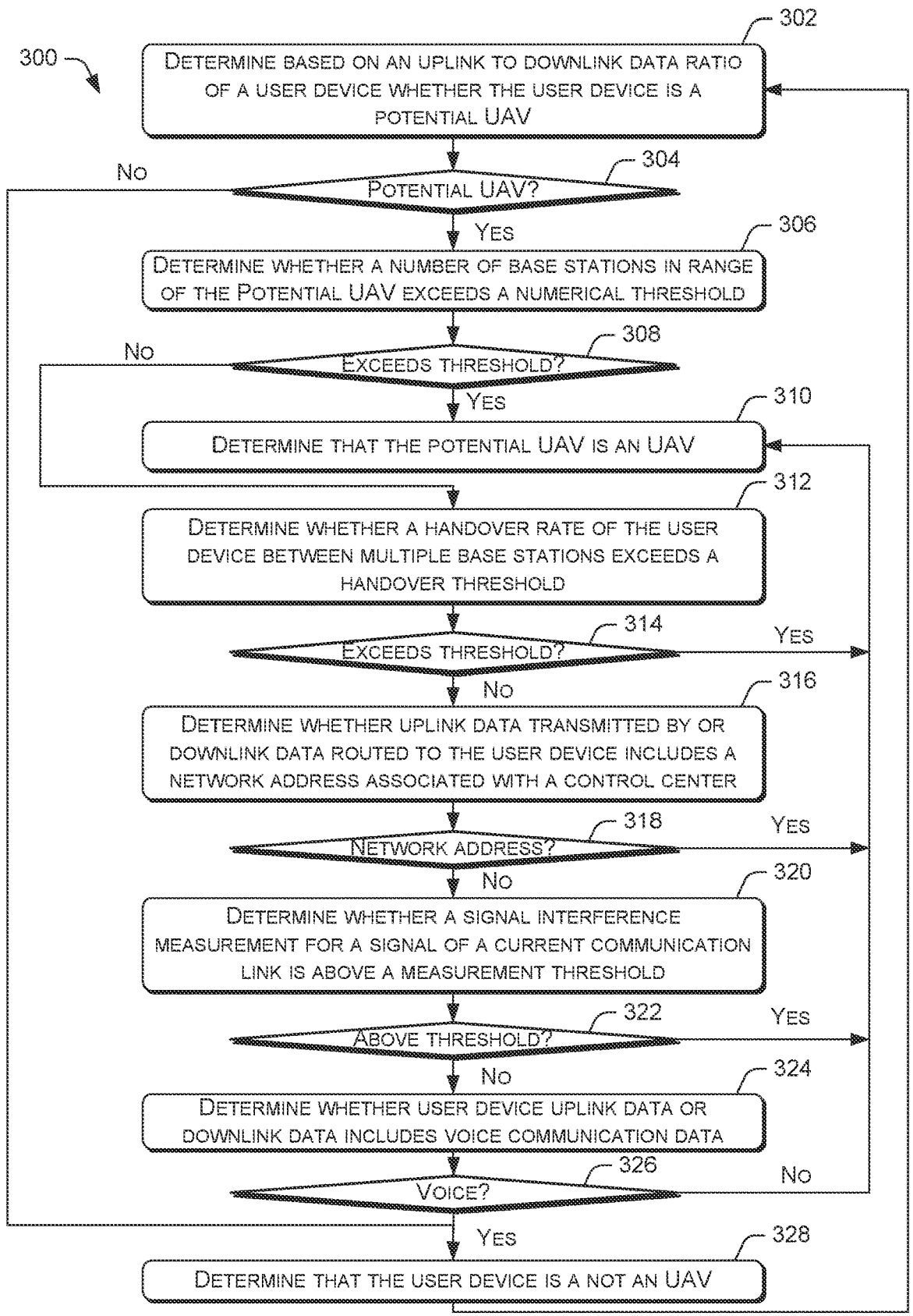
FIG. 3 is a flow diagram of an example process for identifying a user device as an UAV based on multiple user device behavior characteristics.

FIG. 3 is a flow diagram of an example process 300 for identifying a user device as an UAV based on multiple user device behavior characteristics. At block 302, the UAV identification engine 114 may determine based on an uplink to downlink data ratio of a user device whether the user device is a potential UAV. In various embodiments, a user device may be identified by the UAV identification engine 114 as an UAV when the uplink data to downlink data ratio exceeds a predetermined ratio threshold. Otherwise, the UAV identification engine 114 may determine that the user device is a conventional user device, i.e., non-UAV device. Thus, at decision block 304, if the UAV identification engine 114 determines that the user device is a potential UAV, the process 300 may proceed to block 306.

At block 306, the UAV identification engine 114 may determine whether a number of base stations in range of the potential UAV exceeds a numerical threshold. The number of base stations that are in range of a user device may increase as an altitude of the user device from ground level increases. Thus, at decision block 308, if the UAV identification engine 114 determines that the number of base stations in range exceeds the numerical threshold, the process 300 may proceed to block 310. At block 310, the UAV identification engine 114 may determine that the potential UAV is an UAV.

However, at decision block 308, if the UAV identification engine 114 determines that the number of base stations in range does not exceed the numerical threshold, the process 300 may proceed to block 312. The UAV identification engine 114 may determine whether a handover rate of the user device between multiple base stations exceed a handover threshold. In various embodiments, the handover of a user device may increase with increased altitude from ground level due to a greater number of base stations that are in communication range and/or increased signal interference between multiple base stations. Thus, at decision block 314, if the UAV identification engine 114 determines that the handover rate of the potential UAV exceeds a handover rate threshold, the process 300 may once again proceed to block 310 and determine that the potential UAV is an UAV.

However, if the UAV identification engine 114 determines that the handover rate of the potential UAV does not exceed a handover rate threshold at decision block 314, the process 300 may proceed to block 316. At block 316, the UAV identification engine 114 may determine whether the uplink data transmitted by the user device or the downlink data routed to the user device includes data with a network address associated with a ground control center. In various embodiments, the uplink data transmitted by the user device may include location information for the user device. The downlink data routed to the user device may include flight control commands. Thus, at decision block 318, if the UAV identification engine 114 determines that the downlink data or the uplink data of the user device includes a network address associated with a ground control center, the process 300 may once again proceed to block 310 and determine that the potential UAV is an UAV.

However, if the UAV identification engine 114 determines that the downlink data or the uplink data of the user device does not include a network address associated with a ground control center at decision block 318, the process 300 may proceed to block 320. At block 320, the UAV identification engine 114 may determine whether a signal interference measurement of a signal provided by a base station for a current communication link between the wireless communication network 102 and the user device is above a measurement threshold. For example, the signal interference between signals emanating from multiple base stations may increase at higher altitudes due to the lack of ground obstacles and clear line of sight between the base stations. Thus, at decision block 322, if the signal interference measurement is above the measurement threshold, the process 300 may once again proceed to block 310 and determine that the potential UAV is an UAV.

However, if the UAV identification engine 114 determines that the signal interference measurement is not above the measurement threshold at decision block 322, the process 300 may proceed to block 324. At block 324, the UAV identification engine 114 may determine whether the uplink data or the downlink data of the user device includes voice communication data. In various embodiments, the voice communication data may be associated with a voice call or a multimedia call that is initiated between the user device and another device. Thus, at decision block 326, if the UAV identification engine 114 determines that the uplink data or the downlink data does not include voice communication data, the process 300 may proceed once again to block 310 and determine that the potential UAV is an UAV. In some instances, the process 300 may loop back to block 302.

However, if the UAV identification engine 114 determines that the uplink data or the downlink data does include voice communication data at decision block 326, the process 300 may proceed to block 328. At block 328, the UAV identification engine 114 may determine that the user device is a not an UAV. Subsequently, the process 300 may loop back to decision block 302. Returning to decision block 304, if the user device is a conventional user device, the process 300 may proceed directly block 328 and determine that the potential UAV is not an UAV.

FIG. 4 is a flow diagram of an example process 400 for identifying an airborne device as an UAV or a user device carried in a manned aircraft based on multiple user device behavior characteristics. At block 402, the UAV identification engine 114 may identify based on a number of base stations in range of the user device that the user device is potentially airborne. The number of base stations that are in range of a user device may increase as an altitude of the user device from ground level increases. Thus, the user device may be identified as potentially airborne when the number of such base stations exceeds a numerical threshold.

At block 404, the UAV identification engine 114 may compare a trajectory of the user device to ground transit corridor data, such as the ground transit corridor data 230, to determine whether the user device is flying. In various embodiments, if the trajectory indicates that the user device is traveling along a transit way for a predetermined amount of time and within a predetermined speed range of the corresponding speed limit of the transit way, then the UAV identification engine 114 may determine that the user device is not flying. However, the trajectory may indicate that the user device is not traveling along a transit way, or traveled along a transit way for less than a predetermined amount of time and then veered off the transit way and traveled for an additional predetermined amount of time. In the latter scenario, the UAV identification engine 114 may determine that the user device is flying. Thus, at decision block 406, if the user device is determined to be flying, the process 400 may proceed to block 408. At block 408, the UAV identification engine 114 may determine that the user device is an airborne device.

At block 410, the UAV identification engine 114 may determine, based on air transportation data (e.g., air transportation data 228), whether the airborne device was previously located at a landing site for manned aircraft. In various embodiments, a trajectory of the airborne device may be compared to the air transportation data to determine whether the airborne use device was previously located at a landing site for manned aircraft, such as an airport or a building helipad. Thus, if the trajectory of the airborne device originates from or intersects with the location of the landing site for manned aircraft, the UAV identification engine 114 may determine that the airborne device is an airborne user device carried in a manned aircraft. Thus, at decision block 412, if the UAV identification engine 114 determines that the airborne device was previously located at the landing site for manned aircraft, the process 400 may proceed to block 414. At block 414, the UAV identification engine 114 may determine that the airborne device is a non-UAV device carried in a manned aircraft.

However, if the UAV identification engine 114 determines that the airborne device was not previously located at the landing site for manned aircraft at decision block 412, the process 400 may proceed to block 416. At block 416, the UAV identification engine 114 may determine whether the speed of the airborne device exceeds a speed threshold. In various embodiments, the UAV may be incapable of traveling faster than a certain speed due to mechanical or regulatory limitations. Thus, the UAV identification engine 114 may determine that the airborne device is an UAV if the speed of the airborne device is below or at the speed threshold. Conversely, the airborne device may be deemed to be an airborne user device if the speed of the airborne device exceeds the speed threshold. Thus, at decision block 418, if the UAV identification engine 114 determines that the speed of the airborne device exceeds the speed threshold, the process 400 may loop back to block 414 and determine that the airborne device is a non-UAV device carried in a manned aircraft.

However, if the UAV identification engine 114 determines that the speed of the airborne device does not exceed the speed threshold at decision block 418, the process 400 may proceed to block 420. At block 420, the UAV identification engine 114 may determine whether the airborne device is traveling for longer than a predetermined amount of time. For example, manned aircraft generally have longer aloft time than UAVs due to their power output and/or energy storage capacity. Thus, when an airborne device is traveling for more than a predetermined amount of time without stopping, then UAV identification engine 114 may determine that the airborne device is a user device carried in a manned aircraft, rather than being an UAV. In such instances, the airborne device is deemed by the UAV identification engine 114 to be stopped when the airborne device remains stationary at a particular geolocation for a predetermined amount of time. Accordingly, at decision block 422, if the airborne device is traveling for longer than a predetermined amount of time, the process 400 may loop back to block 414 and determine that the airborne device is a non-UAV device carried in a manned aircraft.

However, if the airborne device is not traveling for longer than a predetermined amount of time at decision block 422, the process 400 may proceed to block 424. At block 424, the UAV identification engine 114 may determine whether user device uplink data or downlink data includes voice communication data. In various embodiments, the voice communication data may be associated with a voice call or a multimedia call that is initiated between the airborne device and another device. Thus, if the UAV identification engine 114 determines that the device uplink data or downlink data includes voice communication data, the process 400 may loop back to block 414 and determine that the airborne device is a non-UAV device carried in a manned aircraft.

However, if the UAV identification engine 114 determines that the device uplink data or downlink data does not include voice communication data at decision block 426, the process 400 may proceed to block 428. At block 428, the UAV identification engine 114 may determine that the airborne device is an UAV. Returning to decision block 406, if the user device is not flying, then the process 400 may proceed to block 430. At block 430, the UAV identification engine 114 may determine that the user device is not an UAV. In some instances, the process 400 may loop back to block 402 following block 430.

Figure 5:
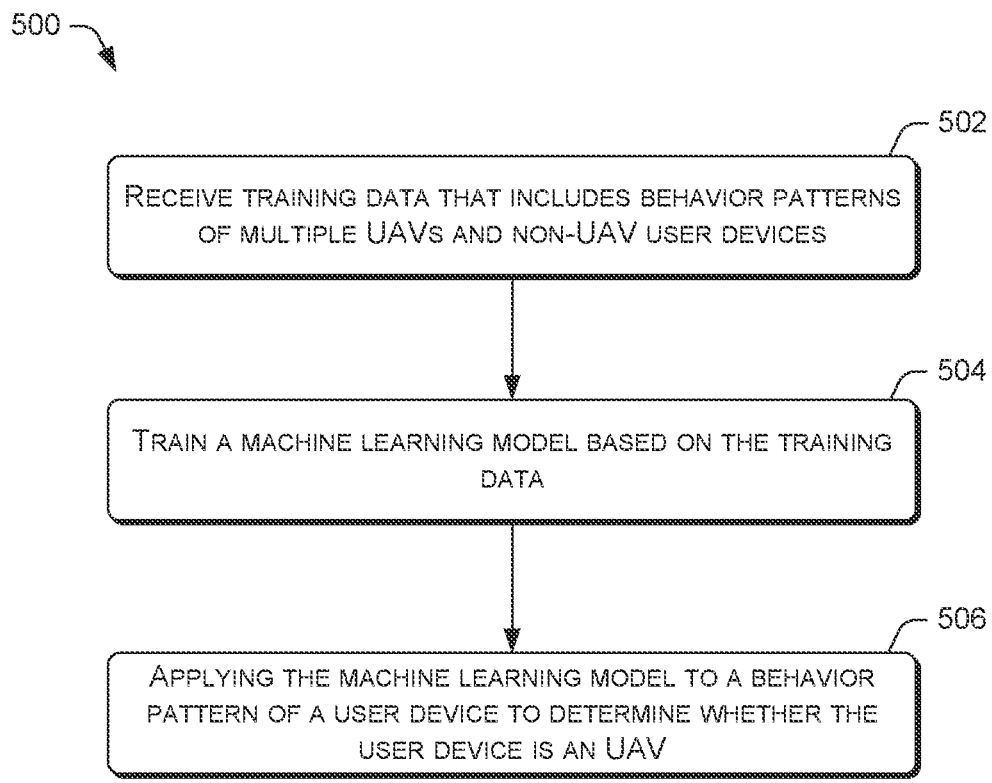
FIG. 5 is a flow diagram of an example process for applying a machine learning model to behavior patterns of user devices to identify a user device as an UAV.

FIG. 5 is a flow diagram of an example process 500 for applying a machine learning model to behavior patterns of user devices to identify a user device as an UAV. At block 502, the UAV identification engine 114 may receive training data that includes behavior patterns of multiple UAVs and non-UAV user devices. The behavior pattern for a user device may include multiple behavior characteristics of the user device. In some embodiments, the training data may further include the air transportation data 228 and the ground transit corridor data 230, among other external data.

At block 504, the UAV identification engine 114 may train a machine learning model based on the training data. In various embodiments, different classification schemes (explicitly and/or implicitly trained) and/or systems may be employed by the machine learning module 218 for the generation of the machine learning model.

At block 506, the UAV identification engine 114 may apply the machine learning model to a behavior pattern of a user device to determine whether the user device is an UAV. In various embodiments, a probability value for whether a user device is an UAV may be calculated using the machine learning model. Subsequently, the UAV identification engine 114 may determine that a user device is an UAV when the probability value exceeds a probability threshold.

Figure 6:
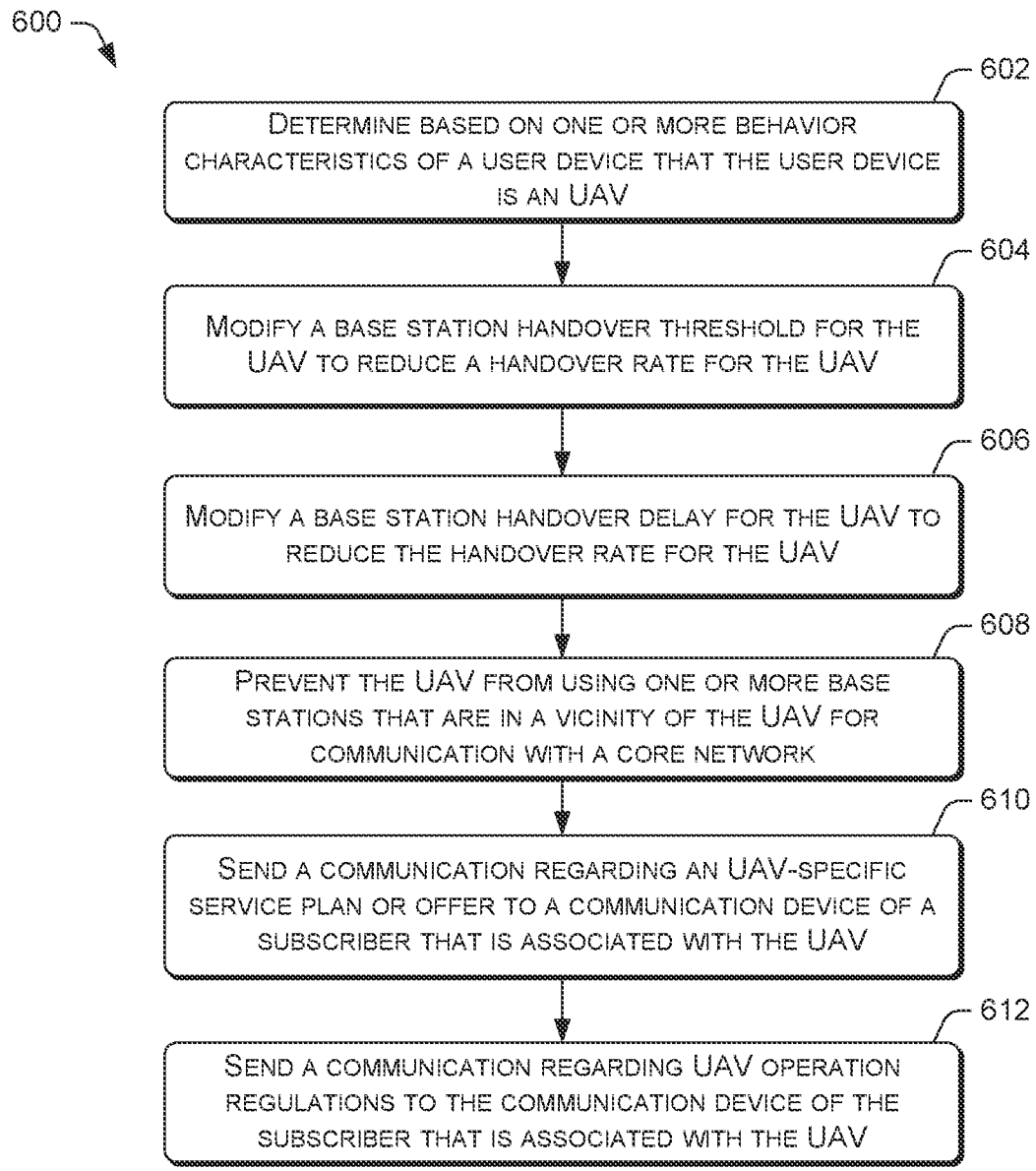
FIG. 6 is a flow diagram of an example process for implementing an operation with respect to a user device following an identification of the user device as an UAV.

FIG. 6 is a flow diagram of an example process 600 for implementing an operation with respect to a user device following an identification of the user device as an UAV. At block 602, the UAV identification engine 114 may determine based on one or more behavior characteristics of a user device that the user device is an UAV. In some embodiments, the determination may be made using an UAV identification algorithm. In other embodiments, the UAV identification engine 114 may use a trained machine learning model to make the determination. At block 604, the UAV identification engine 114 may modify a base station handover threshold for the UAV to reduce a handover rate for the UAV. In various embodiments, the UAV identification engine 114 may decrease a signal strength threshold, or increase a radio interference threshold. Such threshold modifications may prolong a communication duration of the UAV with a base station despite a decrease in signal strength or an increase in signal interference of the radio signal provided by the base station.

At block 606, the UAV identification engine 114 may modify a base station handover delay for the UAV to reduce the handover rate for the UAV. In various embodiments, this delay may provide a possibility for a signal strength or a signal quality of a base station signal to recover during the time delay to make the base station handover unnecessary. Thus, the handover initiation delay may have a similar effect of reducing handover rate of the UAV between stations.

At block 608, the UAV identification engine 114 may prevent the UAV from using one or more base stations that are in a vicinity of the UAV for communication with the core network. In various embodiments, the UAV identification engine 114 may make a certain number of a base stations that are adjacent to a preselected spaced out pattern of base stations unavailable for communication with the UAV. Accordingly, a handover control mechanism of the wireless communication network 102 may ignore specific base stations as being available to takeover communication with the UAV even when a normal handover protocol of the handover control mechanism would have initiated a handover of the UAV to those base stations.

At block 610, the UAV identification engine 114 may send a communication regarding an UAV-specific service plan or offer to a communication device of a subscriber of the wireless communication network 102 that is associated with the UAV. At block 612, the UAV identification engine 114 may send a communication regarding UAV operation regulations to the communication device of the subscriber that is associated with the UAV. It will be appreciated that in some embodiments, the UAV identification engine 114 may perform one or more of the blocks 602-612 without performing other blocks in the process 600.

The identification of a user device as an UAV may cause the wireless communication network to implement certain operations. These operations may include modifying a base station handover threshold or handover delay for the UAV to reduce handover rate of the UAV between base stations. The reduction in handover rate may result in more reliable communication between the UAV and the wireless communication network, as well as the reducing the workload of the wireless communication network.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

The invention claimed is:

1. A system, comprising:
one or more processors; and
memory having instructions stored therein, the instructions, when executed by the one or more processors, cause the one or more processors to perform acts comprising:
determining based on one or more behavior characteristics of a user device that the user device is an unmanned aerial vehicle (UAV) instead of an airborne user device carried in a manned aircraft as the user device communicates with a wireless communication network via one or more base stations; and
in response to determining that the user device is the UAV instead of the airborne user device carried in the manned aircraft, modifying a base station handover threshold for the UAV to prolong a communication duration of the UAV with a base station when a decrease in signal strength or an increase in signal interference of a signal provided by the base station occurs.

2. The system of claim 1, wherein the acts further comprise, in response to determining that the user device is the UAV, modifying a base station handover delay for the UAV to delay an initiation of a handover of the UAV from a first base station to a second base station of the wireless communication network when the base station handover threshold is reached by a signal strength measurement or a signal interference measurement of a radio signal provided by the first base station.

3. The system of claim 1, wherein the determining includes determining that the user device is the UAV instead of an airborne user device carried in the manned aircraft in response to a speed of the airborne user device not exceeding a speed threshold.

4. The system of claim 1, wherein the determining includes determining that the user device is the UAV instead of the airborne user device carried in the manned aircraft in response to a traveling time of the airborne user device being less than a predetermined amount of time.

5. The system of claim 1, wherein the determining includes determining that the user device is the UAV instead of the airborne user device carried in the manned aircraft in response to a lack of voice communication data in uplink data or downlink data of the airborne user device.

6. The system of claim 1, wherein the acts further comprise determining that the user device is the airborne user device carried in the manned aircraft instead of the UAV in response to a trajectory of the user device originating or intersecting a landing site for manned aircraft.

7. The system of claim 1, wherein the acts further comprise determining that the user device is potentially airborne, and wherein the determining based on the one or more behavior characteristics of the user device that the user device is the UAV instead of an airborne user device carried in a manned aircraft is performed following the determining that the user device is potentially airborne.

8. The system of claim 7, wherein the determining that the user device is potentially airborne is made at least in response to: the user device traveling at a trajectory that lacks a corresponding transit way, the user device traveling at a speed that exceeds a speed limit or a current vehicle traffic speed of a transit way by a margin value, or the user device traveling along a transit way for less than a predetermined amount of time, and then traveling along a new trajectory that lack a corresponding transit way for an additional predetermined amount of time.

9. The system of claim 1, wherein the determining includes:
receiving training data that includes behavior patterns of multiple UAVs and non-UAV user devices that communicate with the wireless communication network, wherein behavior pattern of a corresponding UAV or a corresponding airborne user device carried in a manned aircraft including multiple behavior characteristics;
training a machine learning model based on the training data that includes behavior patterns of multiple UAVs and airborne user devices carried in manned aircraft; and
applying the machine learning model to a behavior pattern of the user device to determine that the user device is the UAV instead of the airborne user device carried in the manned aircraft.

10. One or more non-transitory computer-readable media storing computer-executable instructions that upon execution cause one or more processors to perform acts comprising:
determining based on one or more behavior characteristics of a user device that the user device is an unmanned aerial vehicle (UAV) instead of an airborne user device carried in a manned aircraft as the user device communicates with a wireless communication network via one or more base stations; and
in response to determining that the user device is the UAV instead of the airborne user device, modifying a base station handover threshold for the UAV to prolong a communication duration of the UAV with a base station when a decrease in signal strength or an increase in signal interference of a signal provided by the base station occurs.

11. The one or more non-transitory computer-readable media of claim 10, wherein the acts further comprise, in response to determining that the user device is the UAV, modifying a base station handover delay for the UAV to delay an initiation of a handover of the UAV from a first base station to a second base station of the wireless communication network when the base station handover threshold is reached by a signal strength measurement or a signal interference measurement of a radio signal provided by the first base station.

12. The one or more non-transitory computer-readable media of claim 10, wherein the determining includes determining that the user device is the UAV instead of an airborne user device carried in the manned aircraft in response to a speed of the airborne user device not exceeding a s peed threshold.

13. The one or more non-transitory computer-readable media of claim 10, wherein the determining includes determining that the user device is the UAV instead of the airborne user device carried in the manned aircraft in response to a traveling time of the airborne user device being less than a predetermined amount of time.

14. The one or more non-transitory computer-readable media of claim 10, wherein the determining includes determining that the user device is the UAV instead of the airborne user device carried in the manned aircraft in response to a lack of voice communication data in uplink data or downlink data of the airborne user device.

15. The one or more non-transitory computer-readable media of claim 10, wherein the acts further comprise determining that the user device is the airborne user device carried in the manned aircraft instead of the UAV in response to a trajectory of the user device originating or intersecting a landing site for manned aircraft.

16. The one or more non-transitory computer-readable media of claim 10, wherein the acts further comprise determining that the user device is potentially airborne, and wherein the determining based on the one or more behavior characteristics of the user device that the user device is the UAV instead of an airborne user device carried in a manned aircraft is performed following the determining that the user device is potentially airborne.

17. The one or more non-transitory computer-readable media of claim 16, wherein the determining that the user device is potentially airborne is made at least in response to: the user device traveling at a trajectory that lacks a corresponding transit way, the user device traveling at a speed that exceeds a speed limit or a current vehicle traffic speed of a transit way by a margin value, or the user device traveling along a transit way for less than a predetermined amount of time, and then traveling along a new trajectory that lack a corresponding transit way for an additional predetermined amount of time.

18. The one or more non-transitory computer-readable media of claim 10, wherein the determining includes:

receiving training data that includes behavior patterns of multiple UAVs and non-UAV user devices that communicate with the wireless communication network, wherein a behavior pattern of a corresponding UAV or a corresponding airborne user device carried in a manned aircraft including multiple behavior characteristics;

training a machine learning model based on the training data that includes behavior patterns of multiple UAVs and airborne user devices carried in manned aircraft; and applying the machine learning model to a behavior pattern of the user device to determine that the user device is the UAV instead of the airborne user device carried in the manned aircraft.

19. A computer-implemented method, comprising:

determining based on one or more behavior characteristics of a user device that the user device is an unmanned aerial vehicle (UAV) instead of an airborne user device carried in a manned aircraft as the user device communicates with a wireless communication network via one or more base stations; and in response to determining that the user device is the UAV instead of the airborne user device carried in the manned aircraft, modifying a base station handover threshold for the UAV to prolong a communication duration of the UAV with a base station when a decrease in signal strength or an increase in signal interference of a signal provided by the base station occurs.

20. The computer-implemented method of claim 19, further comprising, in response to determining that the user device is the UAV, modifying a base station handover delay for the UAV to delay an initiation of a handover of the UAV from a first base station to a second base station of the wireless communication network when the base station handover threshold is reached by a signal strength measurement or a signal interference measurement of a radio signal provided by the first base station.

* * * * *